United States Patent [19]

Duhayon et al.

[11] 4,036,939
[45] July 19, 1977

[54] METHOD FOR RECOVERY OF HYDROGEN CHLORIDE FROM DILUTE SOLUTIONS

[75] Inventors: Jacques Duhayon, Clamart; Michel Jean Jacques, Paris; Pierre Michel, Courbevoie; Maurice Tarnero, Fontenay-aux-Roses; Edmond Zellner, Gif-sur-Yvette, all of France

[73] Assignee: Commissariat a l'Energie Atomique, Paris, France

[21] Appl. No.: 463,715

[22] Filed: Apr. 24, 1974

[30] Foreign Application Priority Data

Apr. 24, 1973   France .................... 73.14809

[51] Int. Cl.² ............................................. C01B 7/08
[52] U.S. Cl. .................................. 423/488; 423/481; 423/658.5
[58] Field of Search ................. 423/488, 658.5, 481; 23/293 R

[56] References Cited

U.S. PATENT DOCUMENTS

| | | | |
|---|---|---|---|
| 2,303,537 | 12/1942 | Frost, Jr. | 423/488 |
| 2,321,282 | 6/1943 | Comstock | 423/488 |
| 2,357,095 | 8/1944 | Evans et al. | 423/488 X |
| 2,726,142 | 12/1955 | Reeve | 423/488 |
| 2,797,145 | 6/1957 | Gilbert et al. | 423/488 |
| 3,186,809 | 6/1965 | Kreevoy et al. | 423/488 X |
| 3,779,870 | 12/1973 | Gudmundsen et al. | 423/488 X |
| 3,883,642 | 5/1975 | Franke et al. | 423/488 X |

FOREIGN PATENT DOCUMENTS 2,135,764   1/1972   Germany .................... 423/481

*Primary Examiner*—Edward Stern
*Attorney, Agent, or Firm*—Sughrue, Rothwell, Mion, Zinn and Macpeak

[57] ABSTRACT

The method of recovery of hydrogen chloride in gaseous form from an organic solvent loaded with hydrochloric acid in a dilute aqueous solution consists in carrying out prior to distillation a dehydration of the loaded organic solvent in a dehydration extractor in which the solvent is circulated countercurrent to an aqueous solution having a high chloride concentration.

11 Claims, 6 Drawing Figures

METHOD FOR RECOVERY OF HYDROGEN CHLORIDE FROM DILUTE SOLUTIONS

This invention relates to a method in which hydrochloric acid in gaseous form is recovered from dilute solutions or impure gases and in which processes of solvent extraction, dehydration of organic phase and distillation are employed in combination.

It is known that many industrial processes produce effluents consisting of hydrochloric acid either in dilute aqueous solution or in the state of mixtures with other gases. The industrial manufacturer is faced with a choice between two possible course: either the solutions or the gases containing hydrochloric acid are not recovered, in which case it is necessary to have recourse to costly neutralization treatments, or else an attempt is made to recover the acid. Recovery of the acid is a difficult operation since the hydrogen chloride gas produces in aqueous solution an azeotropic mixture having a concentration of 20% of hydrochloric acid. In the case of lower initial concentrations of hydrochloric acid, conventional distillation produces steam and the azeotropic mixture, the concentration of which is insufficient in the majority of industrial applications.

There do exist, however, a number of different methods which result in the production of hydrogen chloride gas or of concentrated aqueous solutions.

The first of these methods consists in distilling the solution after having displaced the point of azeotropy by addition of chloride. This method involves distillation of the entire quantity of water contained in the initial hydrochloric acid solution at a temperature of 140° to 150° C and entails high heat consumption at considerable cost.

In a second method of known type, hydrochloric acid is extracted by an organic solvent; since a part of the water is extracted at the same time, there is added a third solvent which gives rise to separation of the loaded phase into a concentrated aqueous solution of hydrochloric acid and an organic phase made up of two solvents practically without either hydrochloric acid or water. This method results in solutions which have a concentration of 25% of hydrochloric acid and which are distilled so as to obtain dry HCl gas. It is also necessary to distil the mixture of the two solvents before recycling these latter.

The methods of concentration of hydrochloric acid of known type are subject to the disadvantages which arise from high power consumption since the distillation process is applied to solutions which are not sufficiently concentrated.

The precise aim of the present invention is to provide a method which makes it possible to overcome the disadvantage mentioned above by distilling a hydrochloric acid solution in a solvent in which the mass ratio

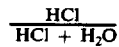

is of the order of 0.6 and is much higher than in the prior art.

SUMMARY OF THE INVENTION

The method of recovery of hydrogen chloride in gaseous form from an organic solvent $S_1$ which has extracted hydrochloric acid and water essentially consists in carrying out prior to distillation a dehydration of the loaded organic in a dehydration extractor $E_1$ in which said solvent is circulated countercurrent to an aqueous solution containing a very high concentration of saltingout chlorides.

DETAILED DESCRIPTION OF THE INVENTION

In accordance with the invention, the organic solvent loaded with dilute hydrochloric acid is obtained either from a dilute hydrochloric acid solution by a method which consists in circulating the aqueous solution within an extractor countercurrent to the solvent $S_1$ or from a mixture of impure gases by a method which consists in circulating the impure gas within a gas-liquid extractor countercurrent to an aqueous solution of salting-out chlorides. The solvent $S_1$ is selected from the group of aliphatic alcohols having preferably a relatively high molecular weight such as 2-methylbutanol-4, heptanol-1 or octanol-2 or a number of other solvents.

In the method according to the invention, the aqueous solution of salting-out chlorides is passed through the extractor $E_1$, then freed of the hydrochloric acid contained therein within another extractor $E_3$. The same solvent $S_1$ as in the extractor $E_2$ is circulated countercurrent to the chloride solution within said extractor $E_3$. The raffinate which leaves the extractor $E_3$ is a chloride solution which no longer contains any hydrochloric acid. The effluent solvent $S_1$ which is loaded with acid and water flows towards the dehydration within the extractor $E_1$.

In accordance with the invention, the chloride solution which has served to carry out the dehydration process is contacted within an extractpr $E_4$ with a solvent $S_2$ which is much more readily miscible with water at low temperature than at high temperature. The chloride solution which is concentrated as a result of extraction of part of the water by the solvent $S_2$ is then returned to the extraction device $E_1$. The solvent $S_2$ which is employed within the extractor $E_4$ is selected from the group of ketones or amines or from other solvents in which the miscibility with water varies appreciably as a function of temperature.

The water contained in the solvent $S_2$ is removed in accordance with the invention as a result of heating which results in separation of constituents. After separation of the two phases, the solvent $S_2$ is recycled in order to produce a further concentration of the chloride solution within the extractor $E_4$.

In order to improve the efficiency of extraction of the hydrochloric acid within the extractor $E_2$, it can be an advantage in accordance with the invention to recirculate a part of the chloride solution which passes out of the extractor $E_3$ and to return this latter to a suitably chosen point of the extraction bank $E_2$. The addition of chlorides to the aqueous phase of the extractor $E_2$ makes it possible to improve the conditions of extraction as a result of its salting-out action. In order to prevent any loss of chlorides, the exit raffinate from the extractor $E_2$ can be fed together with the exit aqueous phase from the extractor $E_3$ into the extractor $E_4$ so as to be concentrated in this latter by the solvent $S_2$.

In the method described by the invention, the distillation process is carried out in a main distillation column, the load being constituted by the loaded solvent issuing from the dehydration extractor $E_1$. Distillation is performed at low pressure, which makes it possible to operate at low temperature. The bottom product of distillation is the solvent $S_1$ which contains practically no hydrochloric acid; the water contained in the entering solvent distils and reaches the top of the column where it is condensed and dissolves a part of the HCl gas in the form of a concentrated solution. A part of this solution can be recycled within the column whilst the other part or the entire quantity of the solution is recycled for extraction to the feed end of the extractor $E_2$.

In accordance with the invention, the aqueous solutions containing small quantities of dissolved solvent, namely the impure water obtained by separation of the solvent $S_2$, the chloride solution after this latter has passed through the extractor $E_4$, the raffinate at the exit of the extractor $E_2$, are subjected to a treatment for removing the solvent. This treatment consists in extracting the dissolved solvent by means of a solvent $S_3$ which is practically immiscible with the aqueous phases, such as dodecane, for example. The mixture of these two solvents is then distilled in order to recycle these latter.

A better understanding of the present invention will in any case be gained from the following description of a number of embodiments of the invention which are given by way of non-limitative example, reference being made to the accompanying drawings, in which.

The originality and advantage of the method are primarily due to the fact that the solvent $S_1$ which has served to extract the hydrochloric acid is partially dehydrated, with the result that a high yield of dry hydrogen chloride gas is obtained at the time of distillation of the loaded solvent $S_1$ and the distillation of small quantities of water, which corresponds to low power consumption. Similarly, heat consumption is reduced to a low value in terms of capital expenditure since the distillation process takes place at a temperature which is either below or equal to 105° C.

Figure 1:
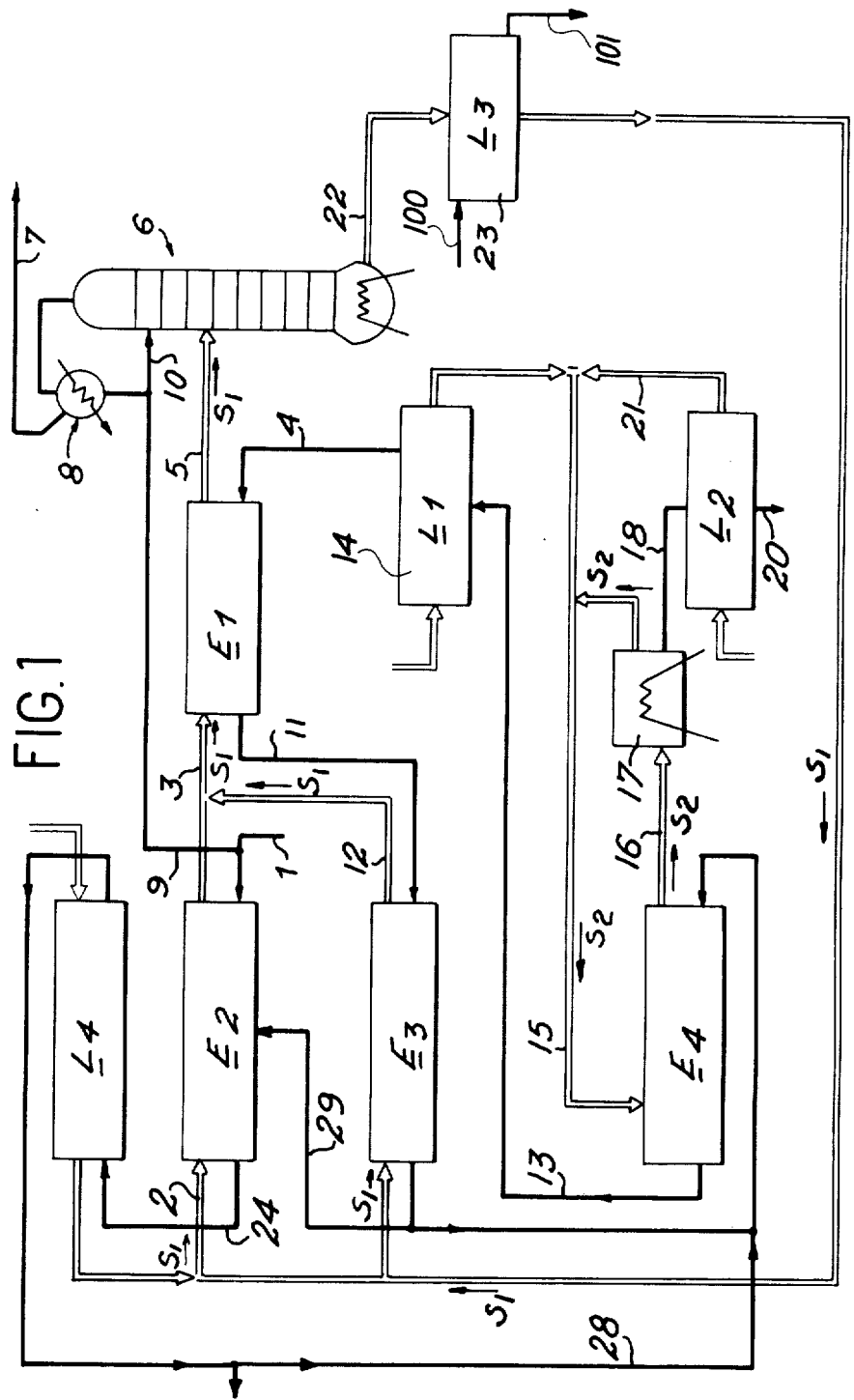
FIG. 1 is a flow diagram showing the application of the method of recovery of hydrochloric acid.

In the first example representing the preferential embodiment of the invention as illustrated in FIG. 1, the starting product is hydrochloric acid in a 23% dilute solution. This solution is fed at 1 into the extractor $E_2$ whilst the solvent $S_1$ which is n-heptanol and is fed through the pipe 2 circulates in countercurrent flow within said extractor. Loaded alcohol is produced within the pipe 3 as a result of extraction in the unit $E_2$ and has a mass ratio $$\frac{HCl}{HCl + H_2O}$$

which is of the order of 0.35. The extraction yield of the hydrochloric acid which passes from the pipe 1 into the pipe 3 is of the order of 90%.

Dehydration of the solvent $S_1$ is carried out within the extractor $E_1$ by a saturated solution of calcium chloride which flows through the pipe 4. At the outlet 5 of the extractor $E_1$, said solution yields a solvent having a mass ratio $$\frac{HCl}{HCl + H_2O}$$

which is of the order of 0.6.

The main distillation column 6 operates at a pressure of 0.1 bar; at this pressure, the temperature within the boiler is approximately 102° C. The distillation process results in the production of hydrogen chloride gas at the head 7 of the column which contains less than 1% of water. The water contained in the fed solvent is distilled and passes to the head of the column within a condenser 8 with a part of the hydrochloric acid in the form of a 10 to 11N hydrochloric acid solution. When employing a non-optimized column, a yield of hydrogen chloride gas of 80% is achieved. The product within the condenser 8 is partly or wholly recycled with the feed product within the pipe 9 and either partly or wholly recycled within the main distillation column via the pipe 10. In this embodiment, the chloride solution employed is a calcium chloride solution. After passing through the extractor $E_1$, said calcium chloride solution is fed through the pipe 11 into the extractor $E_3$ in which n-heptanol is circulated in countercurrent flow, loaded with hydrochloric acid and recycled via the pipe 12 to the inlet of the extractor $E_1$. The calcium chloride solution is reconcentrated within an extractor $E_4$ in which the solvent $S_2$ is circulated in countercurrent flow. At the exit of the extractor $E_4$, the calcium chloride solution within the pipe 13 is recycled to the inlet of the extractor $E_1$ at 4 after passing through a washing unit $L_1$ at 14, said unit being intended to remove from the chloride solution the dissolved solvent $S_2$ which is recycled via the pipe 15 to the extractor $E_4$.

After passing through the extraction unit $E_4$, the solvent $S_2$ which is loaded with water at 16 is freed from this latter by heating in the bath 17 and then recycled to the extractor $E_4$ after separating the phases by settling in said bath 17. The water obtained at the outlet 18 as a result of separation of constituents is freed from the dissolved solvent $S_2$ in a washing unit $L_2$ and discharged into the pipe 20 after washing with dodecane.

The solvent which is recovered at the outlet 21 of the washing unit $L_1$ is recycled through the pipe 15. The solvent $S_1$ which appears at the product end of the main distillation column 22 is recycled to the inlets of the extractors $E_2$ and $E_3$ after passing through a washing unit $L_3$ at 23. The solvent $S_1$ is treated in said unit with an alkaline solution which is admitted at 100 and discharged at 101 in order to be freed from any possible degradation products. The raffinate which leaves the extractor $E_2$ at 24 is treated in the washing unit $L_4$ in which the solvent $S_1$ is separated from the solution by dodecane and can be recycled to the extractor $E_2$ via the line 2 after distillation.

Figure 2:
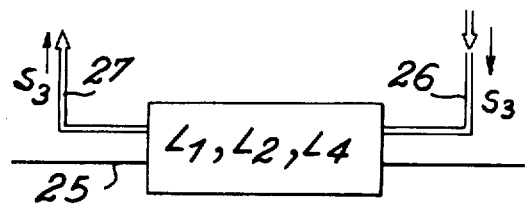
FIG. 2 is a schematic illustration of a washing unit.

There is shown in FIG. 2 the schematic arrangement of a washing unit of the type designated in FIG. 1 by the references $L_1$, $L_2$, $L_4$. Said units are intended to remove the dissolved solvent in aqueous solution by means of a washing treatment countercurrent to dodecane, this solvent being immiscible with the aqueous phase but miscible with the solvents $S_1$ or $S_2$. The dodecane is fed to the inlet 26 and a mixture of two solvents is discharged into the pipe 26, said mixture being separated by distillation in an apparatus of known type which is not illustrated in the figure.

At the exit of the extractor $E_2$ as shown in FIG. 1, the raffinate is first washed in the unit $L_4$ and passed through the pipe 28 to the inlet of the extractor $E_4$ in order to be reconcentrated. A part of the chloride solution 29 which leaves the extractor $E_3$ is fed into the last stages of the extractor $E_2$.

Figure 3:
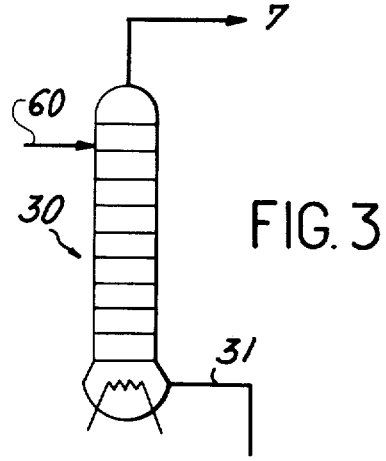
FIG. 3 illustrates a distillation column.

In accordance with the invention, an alternative form of the method consists in distilling in the distillation column 30 the aqueous phase 8 which is condensed at the head of the main distillation column so as to pass through the pipe 1 the azeotrope which is formed at the product end 31 of the secondary column 30 shown in FIG. 3. The aqueous phase collected at 8 is fed into the column 30 through the pipe 60. The hydrogen chloride gas collected at the head of the column passes into the gas produced in the main distillation column via the pipe 7.

Figure 5:
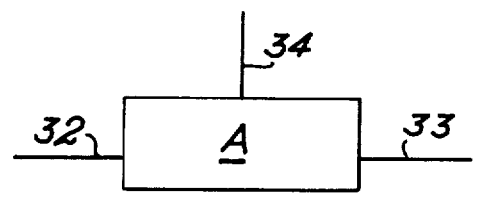
FIG. 5 shows an apparatus for concentrating the chloride solution.
Figure 4:
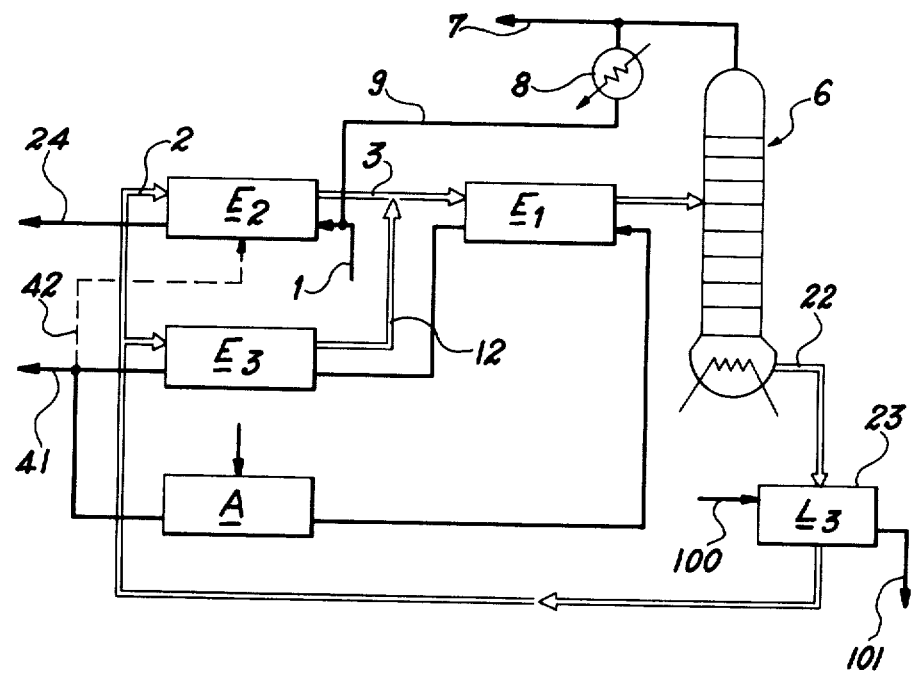
FIG. 4 is a flow diagram showing an alternative mode of application of the invention.

In a second alternative form of the method shown in FIG. 4 in which identical reference numerals designate the same components as those shown in FIG. 1, a part of the chloride solution employed in the extractor $E_1$ is reconcentrated after passing through the extractor $E_3$ by contacting with solid calcium chloride in the unit A. The remainder of the solution corresponding to the quantity of water stripped from the loaded solvent in the dehydration stage is either passed to the effluents in the direction of the arrow 41 or fed into the last stages of the extractor $E_2$ via the pipe 42 in order to increase the efficiency of extraction of hydrochloric acid by the solvent $S_1$ (salting-out effect). In this alternative mode of execution, the chloride solution is reconcentrated after passing through the extractors $E_1$ and $E_3$ within a unit A which is shown diagrammatically in FIG. 5. The unit A consists of a chloride concentrator in which the chloride solution flows from 32 to 33 over solid calcium chloride which is introduced at 34.

In a third alternative form of the method, the chloride solution is reconcentrated by evaporation of the absorbed water after passing through the extractors $E_1$ and $E_3$. This evaporation can be a natural process of exposure to sunshine or can be obtained by heating.

Figure 6:
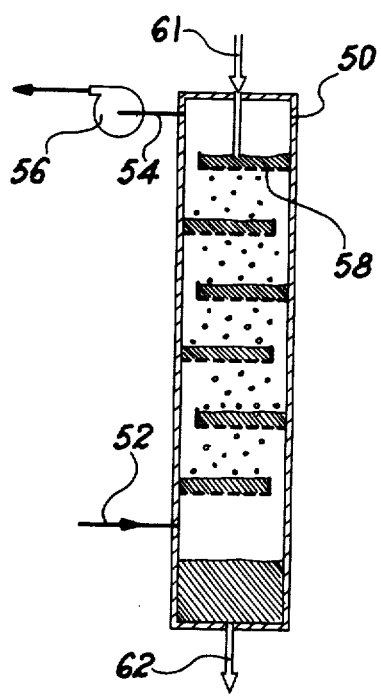
FIG. 6 is a diagram showing one example of an extractor.

The extractors $E_1$, $E_2$, $E_3$, $E_4$ and the washing units $L_1$, $L_2$, $L_3$ and $L_4$ are extractors of known type such as the mixer-settlers having separate stages of the "Savannah" type described in U.S. Report DP MS 67.71 (October, 1967) or of the "Dollfus" type described in French Pat. No. PV 929858 (March, 1963). The extractors can also be continuous-exchange extractors such as the perforated-plate column shown in FIG. 6. This type of extractor comprises a column 50 in which an upflowing stream of liquid is admitted at 52 and discharged at 54, said liquid being circulated by means of the pump 56. The column 50 is provided with trays 58 pierced with small openings and the solvent S which enters the column at 61 is filtered through said openings to be subsequently discharged at 62. During its flow through the column 50, the solvent S and the liquid exchange hydrochloric acid.

What we claim is:

1. A method for recovery of hydrogen chloride contained in an aqueous solution of hydrochloric acid comprising the following steps:
   1. extracting hydrogen chloride and water contained in an aqueous solution of hydrochloric acid by counter current circulation contact of said solution with an organic solvent to load said solvent with hydrogen chloride and water,
   2. dehydrating said solvent containing said hydrogen chloride and water by circulation in exchange relationship with an aqueous solution concentrated in dehydrating inorganic chloride salt,
   3. distilling off hydrogen chloride from said solvent after said dehydration to recover by distillation gaseous hydrogen chloride and leave impure solvent.
   4. recovering the impure solvent after distilling off said hydrogen chloride, and
   5. to recover hydrogen chloride transferred to said aqueous solution of chloride salt, (a) circulating said aqueous solution of chloride salt from step (2) in exchange relationship with another solvent of the same chemical composition as said organic solvent of step (1), said solution of chloride salt being freed from the hydrogen chloride contained therein by transfer of hydrogen chloride and water to said another solvent, and (b) recycling said another solvent loaded with hydrogen chloride and water to dehydration step (2) along with the loaded solvent from step (1).

2. A method according to claim 1, wherein said solvent is an aliphatic alcohol.

3. A method according to claim 1, wherein said aqueous solution of chloride salt used in step (2) of claim 1 is reconcentrated by being contacted with a solvent which is characterized by increasing miscibility with water as a function of increasing temperature.

4. A method according to claim 3, wherein said solvent used in claim 3 is selected from the group consisting of amines and ketones.

5. A method according to claim 3, wherein the water is removed from said solvent by heating, said solvent then being used again for further reconcentration of said aqueous solution of chloride.

6. A method according to claim 1, wherein, after the dehydration step, part of the chloride solution is reconcentrated by contacting with solid chloride salt.

7. A method according to claim 6 wherein the fraction of chloride solution which is not reconcentrated by the chloride salt is passed into an extractor to extract the hydrochloric acid contained in said aqueous solution by said organic solvent.

8. A method according to claim 1 wherein, after the distillating step, said solvent is washed by passage through an alkaline solution and recycled to be used in the extraction step of claim 1.

9. A method according to claim 1, wherein said chloride solution is reconcentrated, after having been freed from the dilute hydrochloric acid, by evaporation of the water.

10. A method according to claim 1, wherein a condensed aqueous phase, obtained by distillation of said solvent, is recycled with said initial aqueous solution of hydrochloric acid.

11. The method according to claim 1 wherein said dehydrating chloride is calcium chloride.

* * * * *